T. R. BAYLISS.
Manufacture of Metallic Cartridge-Case.
No. 159,883.
7 Sheets--Sheet 1.
Patented Feb. 16, 1875.
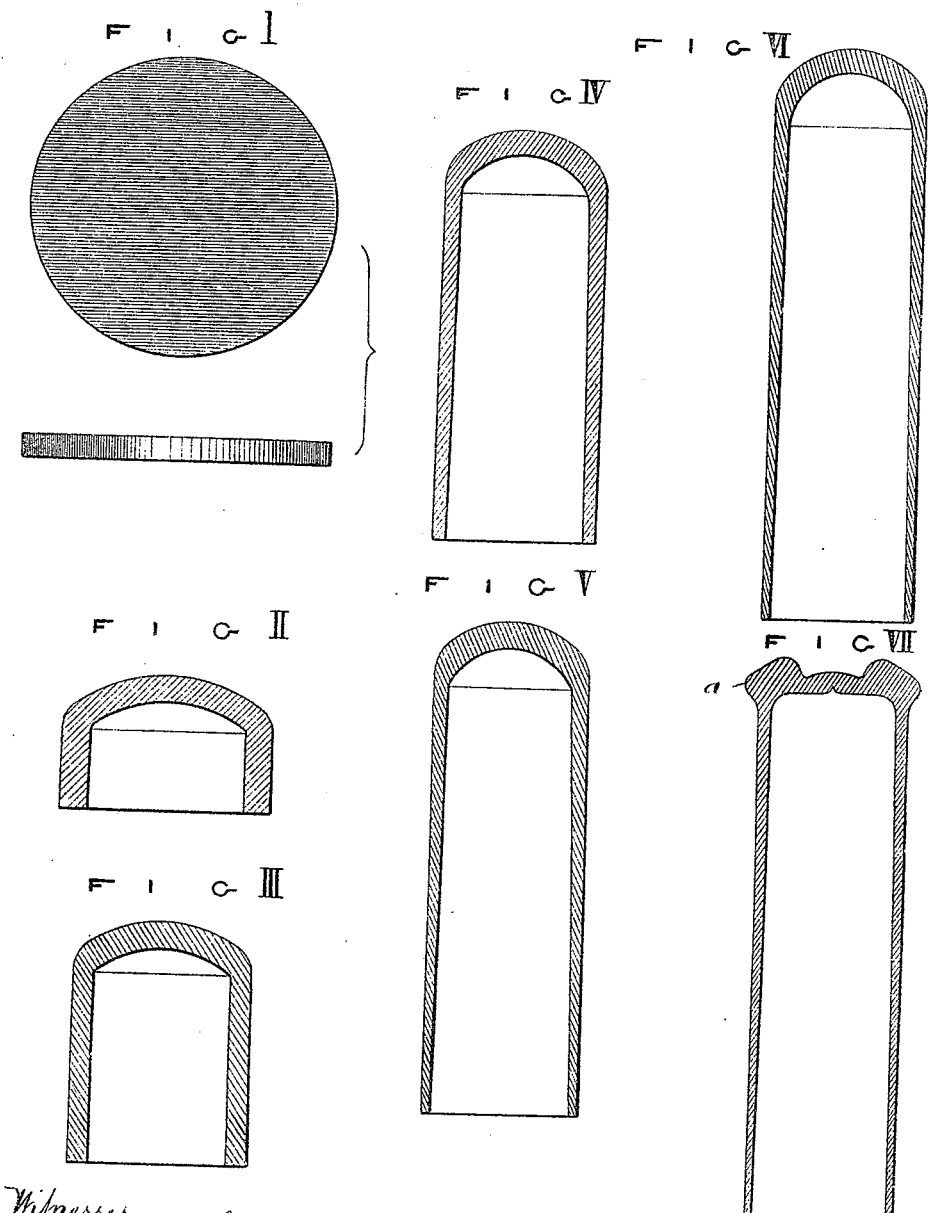

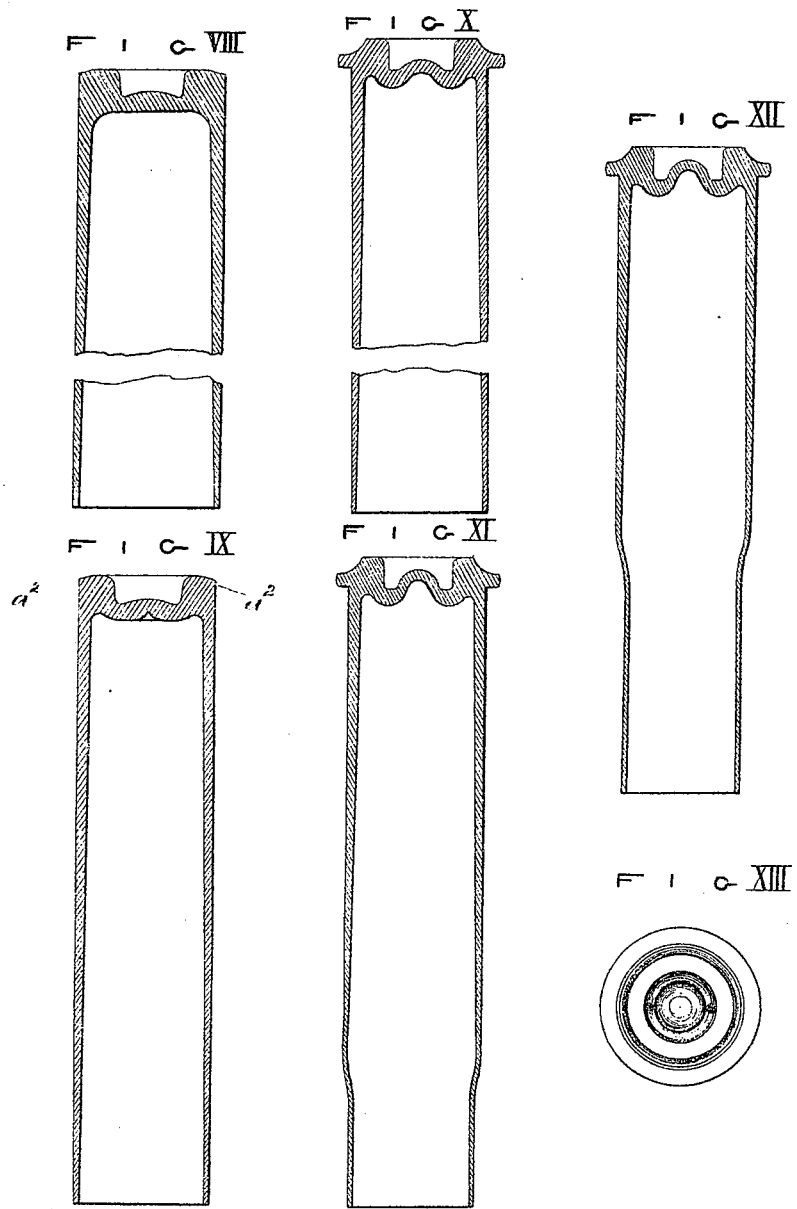

7 Sheets—Sheet 3.
T. R. BAYLISS.
Manufacture of Metallic Cartridge-Case.
No. 159,883. Patented Feb. 16, 1875.
FIG. XIV
FIG. XV
FIG. XVI
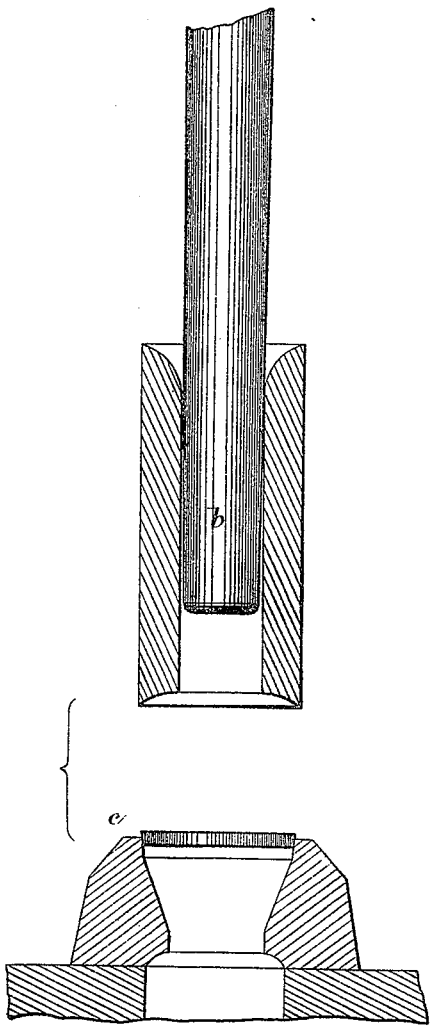
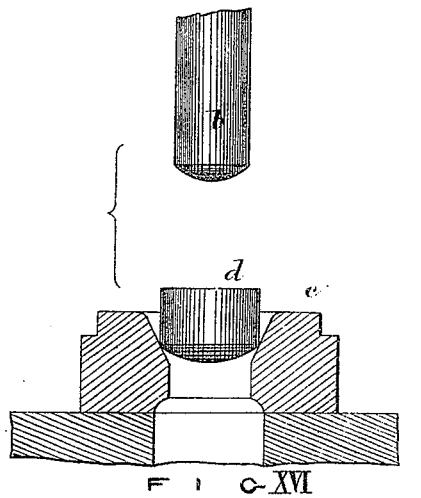
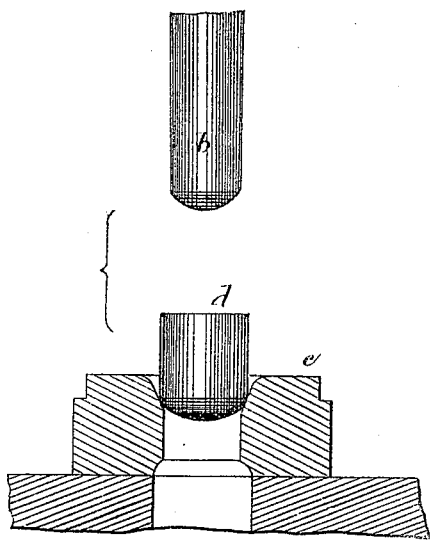
Witnesses,
Richard Skerrett
Henry Skerrett
Inventor
Thomas Richard Bayliss

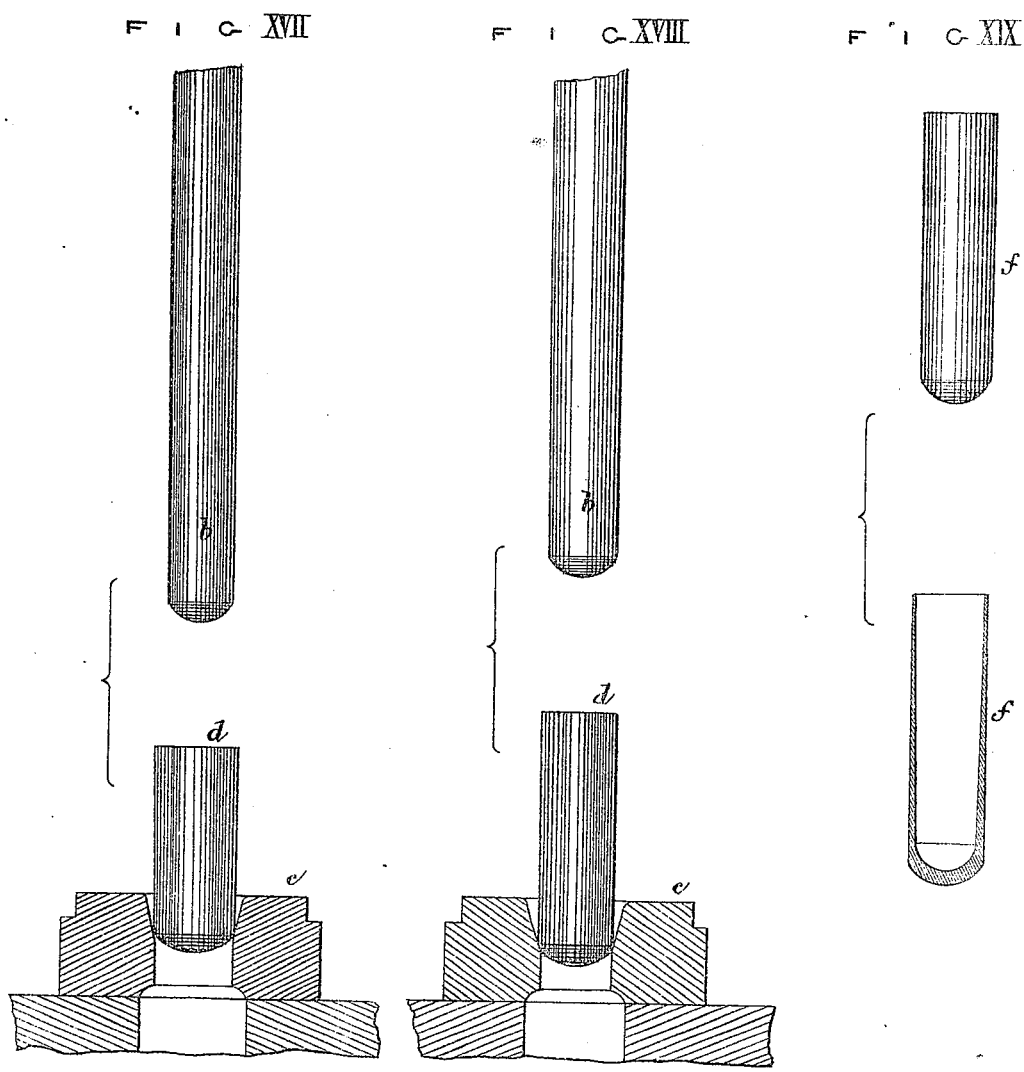

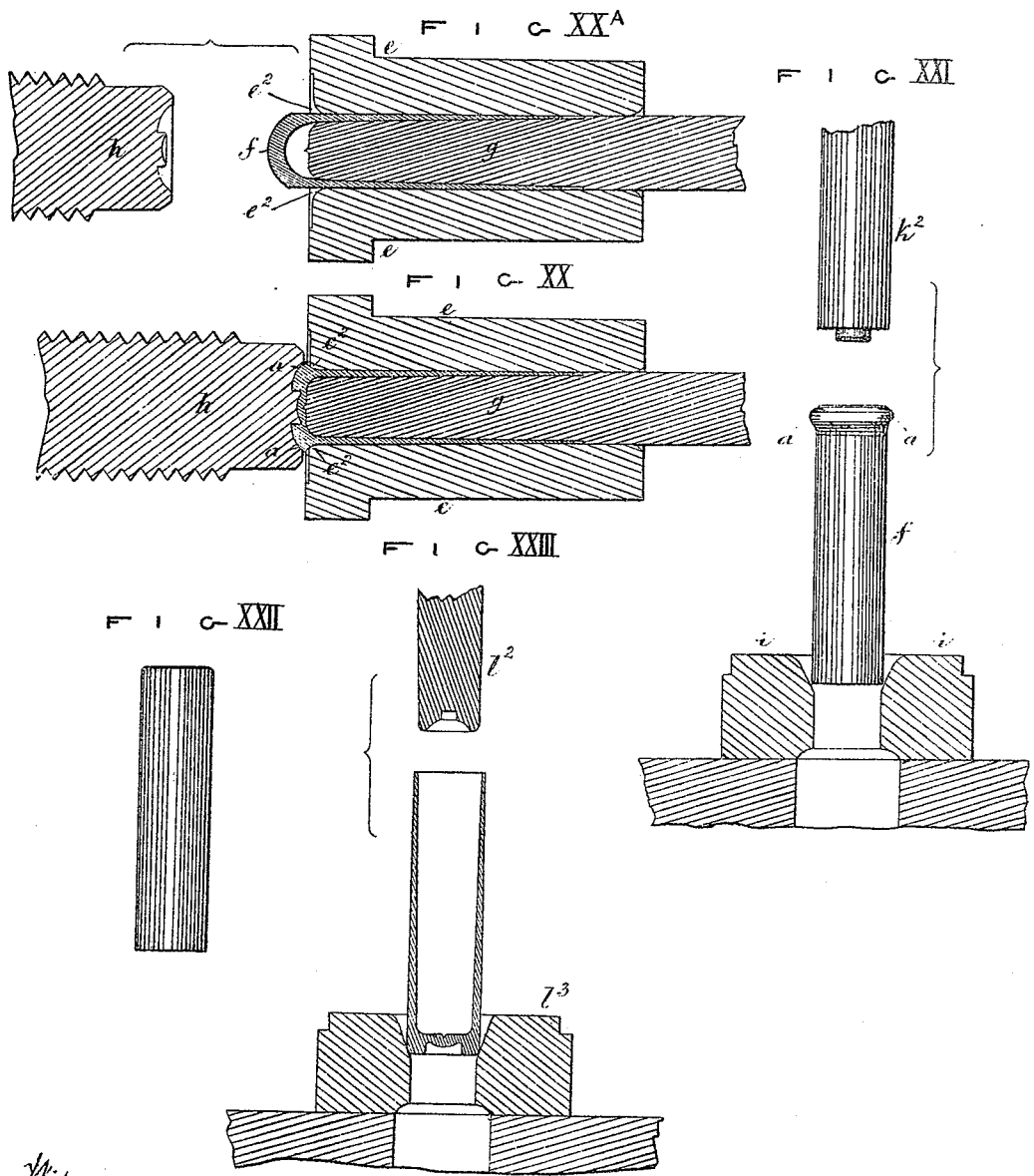

T. R. BAYLISS.
Manufacture of Metallic Cartridge-Case.
No. 159,883. Patented Feb. 16, 1875.
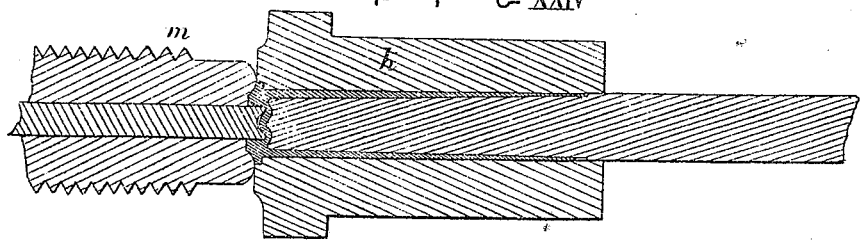
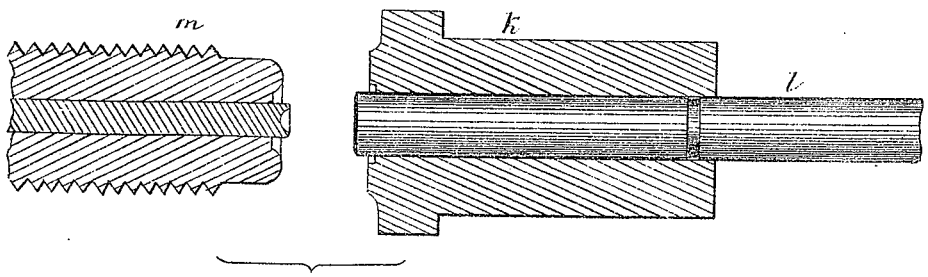
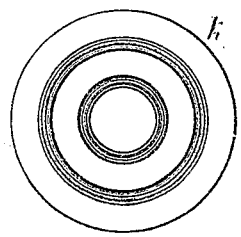
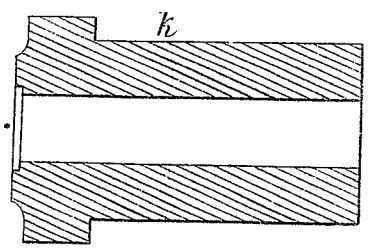
Witnesses,
Richard Skerrett
Henry Skerrett
Inventor
Thomas Richard Bayliss T. R. BAYLISS.
Manufacture of Metallic Cartridge-Case.
No. 159,883. Patented Feb. 16, 1875.
7 Sheets--Sheet 7.
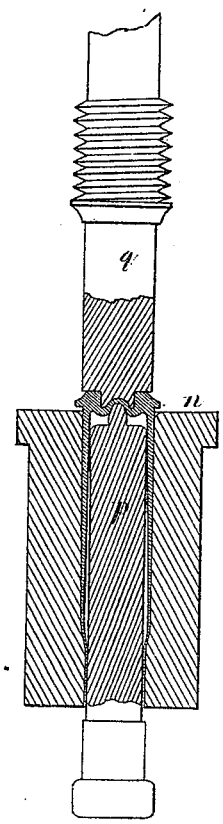
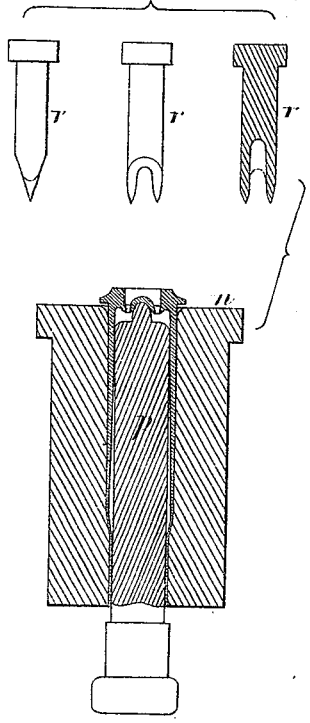
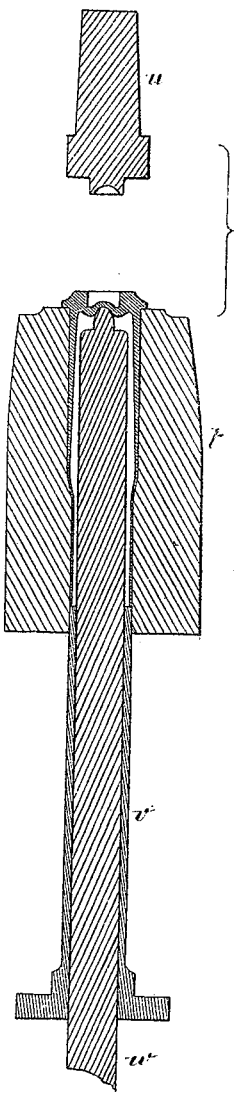

UNITED STATES PATENT OFFICE.

THOMAS R. BAYLISS, OF BIRMINGHAM, ENGLAND.

IMPROVEMENT IN THE MANUFACTURE OF METALLIC CARTRIDGE-CASES.

Specification forming part of Letters Patent No. 159,883, dated February 16, 1875; application filed October 24, 1874.

*To all whom it may concern:*

Be it known that I, THOMAS RICHARD BAYLISS, of Birmingham, in the county of Warwick, England, mechanical engineer, have invented Improvements in the Manufacture of Metallic Cartridge-Cases, of which the following is a specification:

In the ordinary method of manufacturing solid-head metallic cartridge-cases, disks are cut from sheet metal of a proper thickness, and formed into cups by the same machine that cuts out the said disks. These cups are annealed and drawn through dies several times, until the walls of the cases are of the proper dimensions. This process of drawing not only reduces the thickness of the body of the cases, but it also somewhat reduces the thickness of the metal at the head, which is undesirable.

The object of my invention is to thicken the metal at the head of the cartridge-case during the course of its manufacture, so as to render the head more solid and less liable to burst.

I accomplish this in the following manner: After the case has been partly drawn in the usual way, I bulge out the metal at the head with suitable tools, as hereinafter described, which bulging gives the case the appearance of having a slight head or shoulder upon it at the solid end. I then force the case-mouth forward through a die, which draws the metal from the bulged part or shoulder to the solid end, thus making the metal at the said solid end thicker than it was originally.

This process of bulging the metal at the closed end or head and reversing the direction of the drawing of the cases I repeat if very thick solid heads are required.

Instead of bulging the metal out, as described, the case may be forced mouth forward through dies somewhat less in diameter than the case, so as thereby to draw or force the metal to the solid end of the case, and thus make it thicker and more solid at the said end. After thus preparing the cases, they are further drawn, cut to the proper length, and headed in the usual way.

In effecting the bulging at the head of the case I use a lower or fixed die, the interior figure of which is that of a cylinder expanded at top. Into this die the case is forced, mouth forward, by a descending or advancing tool.

By this means the bulging at the head is effected, and the percussion-cap chamber at the same time partly formed; or the cases may be fed into the fixed or lower die in the ordinary way, a portion of the closed end projecting above the die for the advancing tool to act upon.

When the case thus bulged passes through the cylindrical part of the same or another die, the bulged part is compressed to the diameter of the other part, and the metal thereby thickened.

When I effect the thickening at the head of the case by reducing the diameter of the body, I employ a cylindrical lower or fixed die expanded at top, the part below the expanded top being of less diameter than the case.

By forcing the case-mouth forward through the die, the metal is drawn to the solid end or head of the case, which is thereby solidified and thickened.

The two processes described may be combined—that is, the case with a bulged head may be forced through a die, by which its diameter is reduced, and the thickness of the head much increased.

Having explained the nature of my invention, I will proceed to describe, with reference to the accompanying drawings, the manner in which my invention may be performed.

In order that my invention may be the better understood, I have shown in the accompanying drawings the several stages of manufacture of a solid-head metallic cartridge-case, as well as the working tools employed in the said manufacture.

Several of the stages of the manufacture illustrated in the drawings are in common use, and I will hereinafter distinguish between the same and those which constitute my invention.

Figure 1 represents in plan and edge view the disk of metal from which the cup, Fig. 2, is made.

Figs. 3, 4, 5, and 6 represent the progressive drawing stages through which the cup, Fig. 2, is passed, for the purpose of elongating and reducing the thickness of the walls of the said cup.

Fig. 7 represents in section the partly-made case, Fig. 6, after the percussion-cap chamber has been partly formed in the closed end or head, and the metal at the said closed end or head has been bulged out, so as to form a shoulder upon it, the said bulged part or shoulder being marked $a$.

Fig. 8 represents the partly-made cartridge-case, Fig. 7, after it has been forced through the die mouth forward, so as to force the metal at the bulged part or shoulder $a$ into the head, the cap-chamber being at the same time further shaped.

Fig. 9 represents the partly-made cartridge-case, Fig. 8, after it has been further elongated.

Fig. 10 represents the partly-made cartridge-case, Fig. 9, after its rim has been made, and the anvil of the cap-chamber partly shaped.

Fig. 11 represents the cartridge-case after its anvil has been completely shaped and the mouth of the case contracted.

Figs. 12 and 13 represent the completed cartridge-case.

Figs. 1 to 13, both inclusive, are drawn double the full size. All the other figures of the drawings are drawn of the real size.

I will now describe the tools which are employed in the manufacture of the cartridge-case, and will also describe in detail that part of the manufacture of the cartridge-case which constitutes the essence of my invention.

Fig. 14 represents in section the pair of dies or tools by which the drawing through or fashioning of the disk, Fig. 1, into the cup, Fig. 2, is effected.

Figs. 15, 16, 17, and 18 represent the pairs of dies or tools by which the cup, Fig. 2, is successively operated upon to bring it into the shape of Fig. 6.

Fig. 19 represents the case, Fig. 6, drawn to the same scale as the tools, Figs. 14, 15, 16, 17, and 18.

In the said Figs. 14, 15, 16, 17, and 18 the peg or mandrel of the several pairs of tools upon which the cup or partly-made case is drawn is marked $b$; the fixed die through which the cup or partly-made case is drawn is marked $c$; and the cup or partly-made case is marked $d$.

Having brought the partly-made case to the shape of Fig. 19, I next effect the thickening of the closed end or head of the said case, according to my invention—that is to say, I first effect the bulging of the closed end or head of the case, or the production of an external shoulder at the said head, as illustrated in Fig. 7, by means of the tools represented in section in Figs. 20 and 20$^A$. The said tools consist of a fixed die, $e$, the interior of which has for the most part a cylindrical figure of the same diameter as the case to be operated upon, a punch or mandrel, $g$, and a punch or forcing-tool, $h$. The acting end of the die $e$ is expanded at $e^2$. The punch or forcing-tool $h$ having retired after the bulging of a case, the mandrel or punch $g$ is withdrawn from the case $f$ and die $e$, leaving the bulged case $f$, Fig. 20, in the said die $e$. The next case to be bulged is fed in front of the withdrawn mandrel $g$ at the rear end of the die $e$. By the advance of the said mandrel $g$ it enters the case at the rear end of the die $e$, and carries it forward into the die, the bulged case $f$, left in the die $e$, being ejected therefrom by the advance of the said fresh case. By the advance of the mandrel $g$, it carries the case to be operated upon sufficiently far through the die $e$ to cause the closed end or head of the case to project from the expanded face $e^2$ to the distance represented in Fig. 20$^A$.

While the mandrel $g$ is held firmly in the position represented, the punch $h$ advances and compresses the metal of the head of the case $f$, Fig. 20$^A$, into the expanded part $e^2$ of the die, so as thereby to form a bulged part or shoulder, $a$, on the case, as illustrated in Fig. 20, which represents the position of the parts after the tool or punch $h$ has advanced and fashioned the end of the case.

By the operation of the said tool $h$, in conjunction with the end of the tool or mandrel $g$, the cap-chamber in the head of the case is at the same time partly formed. The bulging-tool or punch $h$ retires; the mandrel $g$ also retires from the inside of the bulged case $f$, Fig. 20, when the operations described are repeated.

Instead of feeding the partly-made cartridge-case head forward from the back of the die $e$ into the said die, for the purpose of afterward compressing the head into the expanded part $e^2$ of the said die, and forming thereby the bulged part or shoulder $a$, the cartridge-case $f$, Fig. 19, may be placed in the die $e$ from the front thereof, and so supported that a portion of its closed end projects beyond the acting face of the die $e$, the said projecting end of the case being supported by the mandrel $g$, and operated upon by the heading-tool $h$, as before described.

The case $f$, with its closed end or head bulged in either of the ways described, is next placed mouth forward in the die $i$ of the pair of dies or tools represented in Fig. 21, and forced by the descending punch or tool $k^2$ through the cylindrical part of the said die $i$.

By thus forcing the case $f$ mouth forward through the die $i$, which is of less diameter than the bulged part or shoulder $a$ of the case, the metal of the said bulged part is drawn or forced to the solid end or head of the case, and the said case has now the cylindrical figure represented in Figs. 8 and 22, the said solid end or head being thereby thickened, as shown in the sections, Figs. 8 and 23.

The case, Fig. 22, is next operated upon by the pair of dies or tools $l^2$ $l^3$, Fig. 23. The case being placed in the lower die $l^3$ head forward, the upper tool $l^2$ descends and further elongates the case, as shown in Fig. 9. The cartridge-case is completed by forming the rim on the exterior of the head, perfecting the cap-chamber, forming the anvil of the cap-chamber, and contracting the mouth. These processes are effected in the ordinary way, and by tools of the ordinary kind.

The tools for forming the rim and partly shaping the anvil are represented in Figs. 24, 25, 26, and 27, where $k$ is the fixed die, $l$ the supporting-mandrel, and $m$ the heading-punch.

By an examination of Figs. 9 and 10, it will be seen that the rim is formed by spreading or expanding the metal of the head at the part marked $a^2$, Fig. 9, the metal of the other part of the head being unaffected by the making of the said rim.

The tools for completely shaping the anvil, and for contracting the mouth of the case, are represented in Fig. 28, $n$ being the fixed die; $p$, the mandrel which supports the end of the case while the anvil is completely shaped, and $g$ the tool which carries the case into the die $n$, and, in conjunction with the mandrel $p$, completely shapes the anvil. The tool for piercing the flash-holes in the cap-chamber is shown in connection with the lower die in Fig. 29, and is marked $r$.

The tools for further contracting the mouth of the case are represented in Fig. 30, where $t$ is the fixed die. $u$ is the punch which forces the case into the die $t$. $v$ is the steel tube for ejecting the case from the die $t$, and $w$ is the mandrel for guiding the tube $v$ and supporting the head of the case.

Instead of thickening the head by first forming a bulging part or shoulder on the exterior of the closed end of the case, and afterward compressing the bulging part or shoulder, so as to force it into and thereby thicken the said head, as before described, the said bulging of the closed end of the case may be dispensed with, and the thickening of the head effected in the following manner:

I take the partly-made case, Fig. 19, and place it mouth forward in a fixed die similar to the fixed die of Fig. 21, but of less diameter than the said die, and I force the said case, Fig. 19, through the said die by means of a forcing-tool. By the forcing of the case mouth forward through a die, by which its diameter is reduced, the metal is drawn or carried in the direction of the closed end of the case, which said closed end is thereby thickened. Or the partly-made case, with a bulged head, as in Fig. 21, may be forced through a die of less diameter than that represented in the said Fig. 21, so as to reduce the diameter of the case at the same time that the bulged part is being compressed and forced into the head. By the last-described treatment, in which the two processes hereinbefore described are combined, the head is thickened both by the forcing forward of the metal of the bulged part of the case as well as by the reduction of the diameter of the said case.

By forcing the partially-formed cartridge-cases mouth forward through dies according to my invention, the metal is thickened and solidified at the head, and the said cases can be made from metal thinner at the commencement of the manufacture than that required in manufacturing them in the usual way.

By my improvements the number of drawing processes is less than that required to reduce metal of the thickness which has to be used in the ordinary method of manufacture, and the strength of the metal is not so much injured or diminished, in consequence of the less strain or tension put upon it. Further, the reverse direction of the drawing, whereby I effect the thickening of the head, neutralizes, more or less, the injury done by the strain put upon the metal by the ordinary drawing processes, and the direct and forcible compression to which the metal of the head is especially subjected gives to the metal of the head great density and strength.

I have not thought it necessary to describe and represent the machinery by which the several working tools are actuated, as the said machinery is in common use, and constitutes no part of my invention.

In order that my invention may be the better understood I have described and represented the several stages of the manufacture of a solid-head metallic cartridge-case, including the stages constituting my invention from the blank to the finished case; but I wish it to be understood that several of the said stages of the manufacture herein described and represented constitute no part of my invention. The tools and processes by which the blank, Fig. 1, is made to pass through the various stages represented in Figs. 2, 3, 4, 5, and 6 constitute no part of my invention. Neither do the tools and processes by which the partially-formed cartridge-case is made to pass through the various stages of its manufacture (represented in Figs. 9, 10, 11, 12, and 13) constitute any part of my invention; but the several stages of manufacture whereby the head or closed end of the case is thickened, which stages are illustrated in Figs. 7 and 8, together with the modifications of the said stages herein described, constitute my invention.

Having now described the nature of my invention, and the manner in which the same is to be performed, I wish it to be understood that I do not limit myself to the precise details herein described and illustrated, as the same may be varied without departing from the nature of my invention. I would also state that I do not claim as my invention the upsetting the head of a metallic cartridge-case after the drawing operation; but

I claim as my invention of improvements in the manufacture of metallic cartridge-cases—

The method of thickening and strengthening the closed ends or heads of solid-head metallic cartridge-cases, by forcing the case mouth forward through a cylindrical die, by which the metal is forced or drawn to the closed end or head of the case, substantially as set forth.

THOMAS RICHARD BAYLISS. [L. S.]

Witnesses:
　RICHARD SKERRETT,
　HENRY SKERRETT,
　　　*Of 37 Temple Street, Birmingham.*